United States Patent [19]

Lang

[11] 4,439,475

[45] Mar. 27, 1984

[54] NAP MAT OR CARPET OF WASHABLE TYPE HAVING INCREASED LIQUID REMOVAL THEREFROM DURING WASHING THEREOF

[75] Inventor: Aage Lang, Kolind, Denmark

[73] Assignee: Clean-Tex, Morke, Denmark

[21] Appl. No.: 373,688

[22] Filed: Apr. 30, 1982

[30] Foreign Application Priority Data

May 26, 1981 [DK] Denmark .................. 2287/81

[51] Int. Cl.$^3$ .................. B32B 3/02
[52] U.S. Cl. .................. 428/92; 428/95; 428/132; 428/134; 428/136; 428/137
[58] Field of Search .................. 428/92, 95, 17, 132, 428/134, 136, 137

[56] References Cited

U.S. PATENT DOCUMENTS 3,956,551  5/1976  Richards .................. 428/95
4,161,558  7/1979  See .................. 428/17

Primary Examiner—Marion E. McCamish

Attorney, Agent, or Firm—Earle R. Marden; H. William Petry

[57] ABSTRACT

A floor covering such as a nap mat or carpet of washable type comprises a rubber or plastic back, wherein the nap or tufts is/are fastened in the back material. The floor covering has means for increasing the drain of liquid from the nap when the floor covering is subjected to the influence of a force, such as a pressing force, a centrifugal force, and/or a pressure difference between the front and rear side of the floor covering. This means may be a normally closed perforation of the back material and/or an intermediate tissue via which the nap is secured to the back material. Preferably the intermediate tissue is a non-woven material, mainly consisting of synthetic fibres having a weight of 100–300, preferably 250 g per m$^2$, a fibre thickness of 5–30, preferably 8 decitex, and a tissue thickness of 1–5, preferably 2 mm. Thereby a nap mat or carpet is achieved having a short drying time and/or provides a small drying energy consumption after washing.

15 Claims, No Drawings

NAP MAT OR CARPET OF WASHABLE TYPE HAVING INCREASED LIQUID REMOVAL THEREFROM DURING WASHING THEREOF

The present invention relates to a nap mat or carpet of the washable type having a rubber or plastic back whereby the nap or tufts is/are fastened in the back material.

The nap mat or carpet according to the present invention has means for increasing the liquid drain or removal from the nap when the nap mat or carpet is subjected to the influence of a force, such as a pressing force, a centrifugal force and/or a pressure difference between the front and rear sides of the mat or carpet, to thereby provide a washable nap mat or carpet from which the soap or wash liquid may be removed more efficiently from the nap during an operation of pressing, centrifuging and/or suction. Thereby is it possible either to economize the water consumption or to procure a more complete cleaning, when the amount of water consumed is kept the same, since the normal liquid removal ability has been increased. Furthermore, the increased ability of liquid removal provides that more liquid than normal is removed, so that a mat or carpet according to the invention after washing and a subsequent centrifuging or wringing contains considerably less water, whereby the energy consumption for the subsequent hot air drying, drum drying or the like may be reduced.

As an example of one means which can be utilized to increase the liquid drain or removal from the nap when the mat or carpet is subjected to the influence of such force is an intermediate tissue through which the nap is secured to the back material, the intermediate tissue being, e.g., a non-woven material substantially of synthetic fibers having a weight of 100–300, preferably 250, g/m$^2$, a fiber thickness of 5–30, preferably 8, decitex, and a tissue thickness of 1–5, preferably 2, mm. By use of such intermediate tissue, a nap mat or carpet is provided by which the energy consumption by drying after washing of the mat or carpet is considerably reduced compared to known nap mats or carpets having the same water absorption capacity per m$^2$. The intermediate tissue acts as a wick or a drain for liquid from the center or interior of the napside towards the edges of the mat, so that cavities containing liquid will be emptied via the intermediate tissue. Until now a reduction of at least 20% of the drying time after washing has been found compared to corresponding mats or carpets having the same water absorption capacity. During centrifuging or squeezing after washing a 20–25% larger dewatering than by known nap mats or carpets has been found utilizing the intermediate tissue of the present invention.

The synthetic fibers of the intermediate tissue may advantageously comprise chemo fibers, mineral wool fibers and/or metal fibers, depending on the intended use of the mat or the carpet; and when the synthetic fibers consist of a material having a lower adhesive coefficient to water and a smaller cross section than wool and cotton fibers, it is achieved that the intermediate tissue is provided with a large water absorption capacity because of the large fiber surface per m$^2$ of the mat or carpet, as well as a good dewatering capacity by centrifuging or squeezing after washing of the mat or carpet.

The chemo fibers can be, e.g., fibers of thermoplastic materials having a plasticizing point of 105°–240° C., preferably 237° C., and a melting point of 110°–260° C., preferably 256° C. The fibers of thermoplastic materials are preferably fibers of polyamide, polyester, polyacryl, polyvinyl chloride, polyurethane or polypropylene. These fibers of thermoplastic materials described above have proven suitable for achieving the effect of the invention, particularly with mats or carpets by which fastening the nap and the intermediate tissue in the back takes place by means of thermal fusing or vulcanization. The chemo fibers may, of course, be other materials, whereby the fastening of the intermediate tissue and the nap to the back is carried out by cold gluing.

The intermediate tissue can be tangled together by means of a needle technique having 60–200, preferably 120, needle stitches per cm$^2$. By using such technique to provide the intermediate tissue, the intermediate tissue is provided with an appropriate porosity, liquid absorption capacity and liquid draining effect to the mat edges and/or to back perforations, and simultaneously it permits the use of relatively small forces to the tufting needles by positioning the tufts of the nap in the intermediate tissue. However, the intermediate tissue may also be held together by chemical joining, such as by means of latex adhesives or fusible fibers.

The nap or tufts can be fastened to the intermediate tissue by, e.g., tufting stitches in a number of 4–9, preferably 6, per cm$^2$. By using such fastening, a nap is provided which until now has proven to be optimum as regards the liquid absorption capacity of the mat and liquid draw-off capability or drain effect by an intermediate tissue according to the invention.

Preferred intermediate tissue properties include a porosity measured at water passage through the tissue of 30–150, preferably 50–90, 1 per second per m$^2$, at a pressure drop through the intermediate tissue of 10 cm H$_2$O column.

The intermediate tissue is ensured a permanent appropriate liquid absorption and draining capability by utilizing fibers, for producing the intermediate tissue, which have a shrinkage of 1% at the most, preferably 0.5% at the most, after the fibers have been subjected to an ambient temperature of 200° C. for 10 minutes.

A second means for increasing liquid drain or removal from the nap when the mat or carpet is subjected to the influence of such force is to provide perforations of the rubber or plastic back that are liquid permeable during the subjecting of the mat or carpet to the influence of the force but that are otherwise impermeable to liquid. By providing such perforations, it is achieved that liquid from the napside can escape through the back material along its full extension to avoid forming of liquid traps at the napside. In case the mat or carpet is furnished with both perforations and the aforementioned intermediate tissue a further increase of the drain effect is achieved.

The perforations that are only permeable to liquid while subjecting the mat or carpet to the influence of the force can be provided by needle stitching. By providing the perforations in such manner, a further reduction of the centrifuging time after washing is achieved, as the dewatering takes place both along the edges of the mat or the carpet and through the perforations which by high centrifuging speeds are inclined to open further. By centrifuging of the mat with or without an intermediate tissue such perforations appear to provide a further water passage or dewatering per time unit of 10% or more, besides that the subsequent drying time and consequently the energy consumption may be further reduced. If, instead of a centrifuging or, in connection with a centrifuging, a squeezing of the mat or the carpet between rollers is carried out, at least one of said rollers may advantageously be a porous, hollow suction roller, the effect of which will decrease the subsequent drying time. Instead of being perforated the back may consist of a liquid permeable material, such as an open-celled foam plast, possibly semipermeable.

The nap mat or nap carpet according to the invention is particularly suitable for use as a mat or carpet of the washable type which, e.g., is used as a liquid and/or dust absorbing mat or carpet for laying out on areas where many people walk. The intermediate tissue is used as a basic tissue in tufted mats or carpets wherein the nap may be made of yarns of synthetic, animal, or vegetable origin. The intermediate tissue may be manufactured of synthetic fibers, such as PA, PE, PVC, PU, or fiber mixture combinations with synthetic fibers forming part thereof. The intermediate tissue may be manufactured by a carding process of piled fibers or by extrusion of endless filament fibers being tangled together by means of a needle technique, by chemical joining with latex types such as SBR (styrene butadiene rubber), CSBR (carboxylated styrene butadiene rubber), PVA (polyvinyl acrylate latexes), or acrylates and/or by means of fusible fibers, such as grilan PA.K 115, to a textile basic tissue.

As an example of a non-woven material, which may be used as an intermediate tissue in a first mat or carpet according to the invention, there may be mentioned a material of a gram-weight of 250 g per m$^2$, 1.96 mm thickness in free condition, made of 100% polyester filaments, with a fiber thickness of 0.03 mm diameter corresponding to 8 decitex, with 120 perforations per cm$^2$ by needle technique, with a porosity after needle technique measured by water passage of 50–100 l per second per m$^2$ at 10 cm H$_2$O-column, with a melting temperature of 256° C., with a plasticizing temperature of 237° C., and with a shrinkage measured by the relaxation method of 0.5% at 200° C. measured on 1 m$^2$ loosely disposed in a hot cupboard for 10 minutes. The needle machine used for needling technique was an OSCAR DILO needle machine. The nap consisting of cotton tufts was fastened to the intermediate tissue by 6 tufting stiches per cm$^2$ of the intermediate tissue after the tissue had been tangled together by needle technique with said 120 needle stitches per cm$^2$, and the intermediate tissue with the nap then vulcanized onto a rubber back in a press at 200° C.

In a second mat the intermediate tissue with the nap was also vulcanized onto a rubber back which was perforated after the vulcanization with 1600 needle stitches per m$^2$ by means of needles having a diameter of 2 mm, a stroke length of 7 mm and a needle point length of 2 mm. The perforation of the back may, however, also take place before and during the vulcanization.

By the first mat a 20% larger dewatering by centrifuging after mat washing and before final drying by hot air was found, as the water draw off was compared to that of a known mat with the same water absorption capacity and size. By the second mat a 10% shorter heat drying time was found compared to that of the first mat.

If a mat according to the invention is provided with the same nap quantity or weight per m$^2$ as the known mats, the mat according to the invention obtains a greater liquid absorption capacity, but nevertheless a shorter hot air drying time after centrifuging or pressing between pressing rollers. On the contrary, a smaller quantity of nap per m$^2$ may be used in the mat according to the invention than for prior known mats while still achieving the same liquid absorption capacity and even a still shorter hot air drying time.

In the intermediate tissue of the mat according to the invention, it is also possible to use fibers being oriented principally in the longitudinal direction of the mat. However, there must be some crosswise fibers in the intermediate tissue for securing the strength thereof in the transverse direction of the mat. By this orientation of the fibers the drying time of the mat may be further reduced.

A further use of the mat or the carpet having an intermediate tissue is to be mentioned, said use derives from the high absorption capacity, i.e. as a liquid storage mat, e.g. for dust-binding impregnation liquid, or for disinfection liquid, e.g. for use at hospitals, schools, and public swimming pools.

If a tufting with synthetic fibers, such as nylon fibers, is used instead of cotton tufting, a further decrease of the drying time after the mechanical liquid explusion may be achieved.

Moreover, by this kind of mat or carpet it is advantageous to have a high edge around the edge of the back on the nap side in order to prevent the liquid storage or absorbed liquid of the mat or carpet from passing the edge border of the back.

The mat or carpet may have its drain ability increased by means of the intermediate tissue and/or by perforations in the back material, which perforations preferably are closed liquid-tight only when the mat or carpet is in its normal plane condition of use.

The perforations in the back material can be formed utilizing needles having a Y-formed or V-formed cross section. By forming the perforations in such manner, there is further achieved that each perforation has a valve function, e.g. a relief valve function, the perforations being normally closed but being opened by subjecting the mat to the influence of a force, such as centrifugal force by centrifuging, or a pressing force by squeezing between rollers or by liquid suction, whereby a pressure differential is created between the napside and the rear side of the mat.

What is claimed is:

1. Floor covering such as a nap mat or carpet of the washable type having a nap of fibers on the face side thereof and a rubber-like backing material on the other side thereof, said backing material having a plurality of perforations formed therein which are normally closed and are opened upon the application of a pressing force on the face side of said floor covering.

2. The floor covering of claim 1 wherein said perforations are formed to have a valve function.

3. The floor covering of claim 2 wherein said perforations are Y-shaped.

4. The floor covering of claim 2 wherein said perforations are V-shaped.

5. The floor covering of claim 1 wherein a non-woven material is located between said naps on the face side and said rubber-like backing material.

6. The floor covering of claim 5 wherein the base of said naps pass through said non-woven material and are secured to said backing material.

7. The floor covering of claim 6 wherein said non-woven material is composed of substantially all synthetic fibers and has a weight of 100–300 grams per square meter and a thickness of 1–5 millimeters.

8. The floor covering of claim 7 wherein the fibers of the non-woven material have a thickness of 5–30 decitex.

9. The floor covering of claim 8 wherein the fibers of said non-woven material are chemically formed.

10. The floor covering of claim 9 wherein said fibers are chemically joined by a latex adhesive.

11. The floor covering of claim 9 wherein said fibers are formed by fusible fibers.

12. The floor covering of claim 8 wherein the fibers of said non-woven materials are held together by needle punching.

13. The floor covering of claim 12 wherein said needle punching has about 60–200 needle stitches per square centimeter.

14. The floor covering of claim 7 wherein the synthetic fibers have a maximum shrinkage of 1% after being subjected to an ambient temperature of 200° C. for 10 minutes.

15. The floor covering of claim 6 wherein said naps are tufted through said non-woven material.

* * * * *